United States Patent
Vasilevskiy et al.

(10) Patent No.: US 7,392,516 B2
(45) Date of Patent: Jun. 24, 2008

(54) METHOD AND SYSTEM FOR CONFIGURING A DEPENDENCY GRAPH FOR DYNAMIC BY-PASS INSTRUCTION SCHEDULING

(75) Inventors: Alexander Vasilevskiy, Montreal (CA); Marcel Mitran, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 10/912,482

(22) Filed: Aug. 5, 2004

(65) Prior Publication Data

US 2006/0031823 A1 Feb. 9, 2006

(51) Int. Cl.
G06F 9/45 (2006.01)

(52) U.S. Cl. .................. 717/159; 717/151; 717/152; 717/153; 717/154; 717/155; 717/156; 717/157

(58) Field of Classification Search .......... 717/151–161
See application file for complete search history.

(56) References Cited

U.S. PATENT DOCUMENTS

2004/0003384 A1* 1/2004 Pechtchanski et al. ...... 717/158
2006/0048111 A1* 3/2006 Archambault et al. ...... 717/144
2006/0048124 A1* 3/2006 Martin ....................... 717/160
2006/0048125 A1* 3/2006 Martin ....................... 717/161

FOREIGN PATENT DOCUMENTS

JP 5165397 A 7/1993

* cited by examiner

*Primary Examiner*—William H Wood
(74) *Attorney, Agent, or Firm*—Matt Talpis; Gregory K. Goshorn; Greg Goshorn, P.C.

(57) ABSTRACT

There is disclosed a method and system for configuring a data dependency graph (DDG) to handle instruction scheduling in computer architectures permitting dynamic by-pass execution, and for performing dynamic by-pass scheduling utilizing such a configured DDG. In accordance with an embodiment of the invention, a heuristic function is used to obtain a ranking of nodes in the DDG after setting delays at all identified by-pass pairs of nodes in the DDG to 0. From among a list of identified by-pass pairs of nodes, a node that is identified as being the least important to schedule early is marked as "bonded" to its successor, and the corresponding delay for that identified node is set to 0. Node rankings are re-computed and the bonded by-pass pair of nodes are scheduled in consecutive execution cycles with a delay of 0 to increase the likelihood that a by-pass can be successfully taken during run-time execution.

1 Claim, 5 Drawing Sheets

| Instruction (Node) | Critical Path | Earliest Time |
|---|---|---|
| 1 | 3 | 1 |
| 2 | 2 | 2 |
| 3 | 1 | 3 |
| 4 | 0 | 4 |
| 5 | 1 | 2 |
| 6 | 2 | 1 |
| 7 | 0 | 3 |

FIG. 3A — 300A

| Ready List | Schedule | Execution Cycle |
|---|---|---|
| {1, 6} | 1 | 1 |
| {2, 6} | 2 | 2 |
| {3, 6} | 6 | 3 |
| {3, 5} | 5 | 4 |
| {3, 7} | 3 | 5 |
| {4, 7} | 7 | 10 |
| {4} | 4 | 11 |

| Instruction (Node) | Critical Path | Earliest Time |
|---|---|---|
| 1 | 3 | 1 |
| 2 | 2 | 2 |
| 3 | 1 | 3 |
| 4 | 0 | 4 |
| 5 | 6 | 2 |
| 6 | 7 | 1 |
| 7 | 0 | 8 |

| Ready List | Schedule | Execution Cycle |
|---|---|---|
| {1, 6} | 6 | 1 |
| {1, 5} | 5 | 2 |
| {1, 7} | 1 | 3 |
| {2, 7} | 2 | 4 |
| {3, 7} | 3 | 5 |
| {4, 7} | 7 | 8 |
| {4} | 4 | 9 |

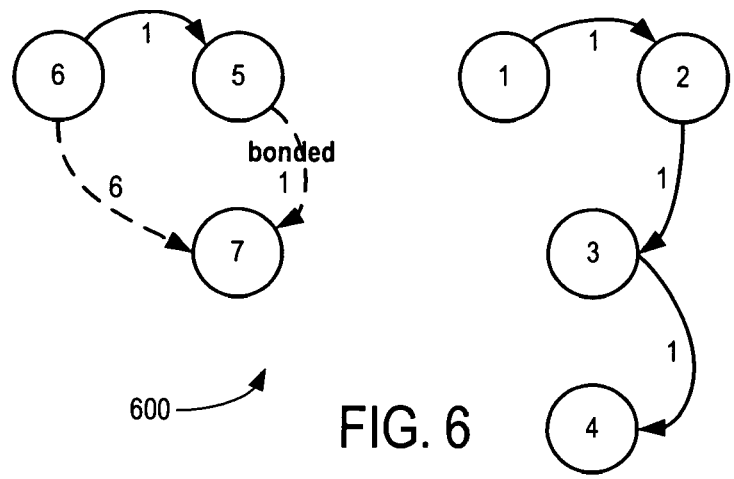
600 — FIG. 6
| Instruction (Node) | Critical Path | Earliest Time |
|---|---|---|
| 1 | 3 | 1 |
| 2 | 2 | 2 |
| 3 | 1 | 3 |
| 4 | 0 | 4 |
| 5 | 1 | 2 |
| 6 | 2 | 1 |
| 7 | 0 | 3 |
FIG. 7A  — 700A
| Instruction (Node) | Critical Path | Earliest Time |
|---|---|---|
| 1 | 3 | 1 |
| 2 | 2 | 2 |
| 3 | 1 | 3 |
| 4 | 0 | 4 |
| 5 (bonded to 7) | 1 | 6 |
| 6 | 6 | 1 |
| 7 | 0 | 7 |
FIG. 7B  — 700B
| Ready List | Schedule | Execution Cycle |
|---|---|---|
| {1, 6} | 6 | 1 |
| {1, 5} | 1 | 2 |
| {2, 5} | 2 | 3 |
| {3, 5} | 3 | 4 |
| {4, 5} | 4 | 5 |
| {5, 7} | 5 | 6 |
| {7} | 7 | 7 |
FIG. 7C  — 700C

METHOD AND SYSTEM FOR CONFIGURING A DEPENDENCY GRAPH FOR DYNAMIC BY-PASS INSTRUCTION SCHEDULING

BACKGROUND OF THE INVENTION

The present invention relates generally to data processing systems and software optimization, and in particular to a method and system for configuring and for using a data dependency graph ("DDG") for dynamic by-pass instruction scheduling.

As known to those skilled in the art, a DDG is a type of directed acyclic weighted graph that may be used to represent relationships between instructions during scheduling. For example, a DDG may contain a plurality of nodes representing instructions within a "basic block" containing straight-line execution code. Directed edges between the nodes in the DDG identify causal dependencies (by convention, a "successor" node has a causal dependency upon a "predecessor" node).

The edges between a pair of nodes may be annotated with "weights" representing a sum of delays and latencies between the nodes. Delay is incurred, for example, as a result of pipeline stalls that typically occur when an instruction requires the results of another instruction before it can execute. Latency is a characteristic lag time resulting from the execution of an instruction. Both delay and latency may be measured in the same time unit, namely execution cycles, and may be summed together to obtain the "weight" or total time in cycles.

Given a DDG representing a basic block of instructions, a heuristic function can be used to rank nodes representing instructions in the DDG for the purposes of scheduling those instructions. In a commonly used heuristic function, nodes in the DDG are ranked based on the "critical path" length of a node. Generally speaking, the critical path for a node "i" in a DDG (representing an instruction "i") is defined as the sum of the weights of edges along a path from node "i" to the furthest leaf node in the graph (i.e. to a node having no further edge connections to other nodes in the DDG). As known in the art, scheduling may be prioritized so that instructions (i.e. nodes in the DDG) with longer critical paths are scheduled first. This scheduling strategy assumes that executing instructions with the longest critical paths first will generally tend to minimize the total execution time for a given set of instructions.

A closely related concept in instruction scheduling based on DDG analysis is an "earliest time" for an instruction. Generally speaking, the earliest time for a node "i" in a DDG (representing an instruction "i") is the earliest execution cycle in which instruction "i" may be scheduled in view of causal dependencies with predecessor nodes.

Known scheduling techniques based on DDG analysis are limited in that they generally support only delays that are fixed when a DDG is first created. These known techniques are not optimal for handling delays that can change dynamically, such as may be found in some modern computer architectures permitting dynamic by-pass execution. (Such computer architectures permit a delay between a by-pass pair of instructions to change dynamically between a full delay and a zero delay, as explained in further detail below.)

What is needed is a technique for configuring a dependency graph to handle instruction scheduling in architectures permitting such dynamic by-pass execution.

SUMMARY OF THE INVENTION

There is provided a method and system for configuring and using a data dependency graph (DDG) for performing dynamic by-pass scheduling.

In an embodiment of the invention, a suitable heuristic function is first used to rank nodes in the DDG after setting delays between all identified by-pass pairs of nodes in the DDG to 0. By way of example, one such heuristic function computes the critical path of each node in the DDG. By-pass pairs comprising predecessor/successor nodes $A_i^p$, $A_i^s$ are identified in the DDG and placed in a by-pass candidate list BPL $(A_i^s)$. Any by-pass candidate that is a predecessor to another by-pass candidate is removed from the by-pass candidate list BPL $(A_i^s)$. Of the remaining by-pass candidates, a node $A_i^p$ having the shortest delay (e.g. shortest critical path) is marked as "bonded" to its successor $A_i^s$, and the corresponding delay between the predecessor/successor pair $A_i^p$, $A_i^s$ is set to 0. The delays for all other by-pass candidates in the by-pass candidate list BPL $(A_i^s)$ are set to a full delay DAi. More generally, the nodes that are "bonded" together are processed as follows: For a predecessor node $A_i^p$ bonded to successor node $A_i^s$, the earliest time ("Etime") for node $A_i^p$ is set to Etime $(A_i^p)$=Etime $(A_i^s)$−1. Heuristic based scheduling (e.g. critical path based instruction scheduling) is then performed again on the nodes of the DDG such that, each time a node $A_i^p$ is scheduled, any node $A_i^s$ bonded to node $A_i^p$ is scheduled immediately thereafter in the next execution cycle.

More generally, in an aspect of the invention, there is provided a method of configuring a data dependency graph (DDG) for dynamic by-pass instruction scheduling, the DDG including at least one by-pass pair of nodes $(A_i^p, A_i^s)$ comprising a predecessor node $A_i^p$ and a successor node $A_i^s$ connected by a by-pass edge, the method comprising:

(i) annotating each successor node $A_i^s$ with a set of immediate predecessor nodes $A_i^p$ to form a by-pass list BPL$(A_i^s)$ of by-pass pairs $(A_i^p, A_i^s)$;

(ii) for each by-pass list BPL$(A_i^s)$ selecting from the each by-pass list BPL$(A_i^s)$ a given predecessor node $A_i^p$ identified as being least important to schedule early, and labeling the given predecessor node $A_i^p$ as being bonded to its corresponding successor node $A_i^s$, such that the corresponding successor node $A_i^s$ is scheduled immediately after the given predecessor node $A_i^p$.

In an embodiment, a delay of 0 is set between the given predecessor node $A_i^p$ and its corresponding successor node $A_i^s$.

In another embodiment, the method further comprises:
(iii) before (ii), setting a full delay DAi for all by-pass pairs $(A_i^p, A_i^s)$ in the by-pass list BPL$(A_i^s)$.

In another embodiment, the method further comprises:
(iv) after (iii) and before (ii), removing from the by-pass list BPL$(A_i^s)$ any by-pass pair $(A_i^p, A_i^s)$ that is a predecessor to any other by-pass pair $(A_i^p, A_i^s)$.

In another embodiment, the method further comprises:
(v) after (ii), re-computing earliest times for each node in the DDG so that, if a node $A_i^p$ is bonded to node $A_i^s$, an earliest time for node $A_i^p$ is calculated as an earliest time for node $A_i^s$ less 1 execution cycle.

In another embodiment, the selecting in (ii) comprises selecting a predecessor node $A_i^p$ with the shortest critical path.

In another aspect of the invention, there is provided a method of performing dynamic by-pass instruction scheduling utilizing a data dependency graph (DDG), the DDG including at least one by-pass pair of nodes $(A_i^p, A_i^s)$ comprising a predecessor node $A_i^p$ and a successor node $A_i^s$ connected by a by-pass edge, the method comprising:

computing a ranking of nodes in the DDG after setting all delays for by-pass pairs of nodes $(A_i^p, A_i^s)$ to 0;

identifying all successor nodes $A_i^s$ in the DDG;

annotating each successor node $A_i^s$ with a set of immediate predecessor nodes $A_i^p$ to form a by-pass list $BPL(A_i^s)$ of by-pass pairs $(A_i^p, A_i^s)$;

setting a delay DAi for all by-pass pairs $(A_i^p, A_i^s)$ in the by-pass list $BPL(A_i^s)$;

removing from the by-pass list $BPL(A_i^s)$ any by-pass pair $(A_i^p, A_i^s)$ that is a predecessor to any other by-pass pair $(A_i^p, A_i^s)$;

selecting from the by-pass list $BPL(A_i^s)$ a given predecessor node $A_i^p$ being identified as the least important to schedule early, and marking the given predecessor node $A_i^p$ as being bonded to its corresponding successor node $A_i^s$ with a delay of 0 execution cycles;

re-computing a ranking for each node in the DDG so that an earliest time for the given predecessor node $A_i^p$ is calculated as an earliest time for the successor node $A_i^s$ less 1 execution cycle;

scheduling nodes in the DDG so that, each time the given predecessor node $A_i^p$ is scheduled, the corresponding successor node $A_i^s$ is scheduled immediately thereafter.

In an embodiment the ranking of nodes in the DDG is computed and re-computed based on a critical path of the nodes, and the selecting a predecessor node $A_i^p$ is based on identifying a given predecessor node $A_i^p$ as having the shortest critical path.

In another aspect of the invention, there is provided a system for configuring a data dependency graph (DDG) for by-pass instruction scheduling, the DDG including at least one by-pass pair of nodes $(A_i^p, A_i^s)$ comprising a predecessor node $A_i^p$ and a successor node $A_i^s$ connected by a by-pass edge, the system comprising a processor and a memory storing software adapted to:

(a) annotate each successor node $A_i^s$ with a set of immediate predecessor nodes $A_i^p$ to form a by-pass list $BPL(A_i^s)$ of by-pass pairs $(A_i^p, A_i^s)$;

(b) select from the each by-pass list $BPL(A_i^s)$ a given predecessor node $A_i^p$ identified as being least important to schedule early, and label the given predecessor node $A_i^p$ as being bonded to its corresponding successor node $A_i^s$, such that the corresponding successor node $A_i^s$ is scheduled immediately after the given predecessor node $A_i^p$.

In an embodiment, a delay of 0 is set between the given predecessor node $A_i^p$ and its corresponding successor node $A_i^s$.

In another embodiment, the software is further adapted to:
(c) before (b), set a full delay DAi for all by-pass pairs $(A_i^p, A_i^s)$ in the by-pass list $BPL(A_i^s)$.

In another embodiment, the software is further adapted to:
(d) after (c) and before (b), remove from the by-pass list $BPL(A_i^s)$ any by-pass pair $(A_i^p, A_i^s)$ that is a predecessor to any other by-pass pair $(A_i^p, A_i^s)$.

In another embodiment, the software is further adapted to:
(e) after (b), re-compute earliest times for each node in the DDG so that, if a node $A_i^p$ is bonded to node $A_i^s$, an earliest time for node $A_i^p$ is calculated as an earliest time for node $A_i^s$ less 1 execution cycle.

In another embodiment, in (b) the software is further adapted to select a predecessor node $A_i^p$ with the shortest critical path.

In another aspect of the invention, there is provided a computer readable medium containing computer executable code that when loaded at a computer is operable for configuring a data dependency graph (DDG) for dynamic by-pass instruction scheduling, said DDG including at least one by-pass pair of nodes $(A_i^p, A_i^s)$ comprising a predecessor node $A_i^p$ and a successor node $A_i^s$ connected by a by-pass edge, said computer executable code being configurable to:

(a) annotate each successor node $A_i^s$ with a set of immediate predecessor nodes $A_i^p$ to form a by-pass list $BPL(A_i^s)$ of by-pass pairs $(A_i^p, A_i^s)$;

(b) select from each by-pass list $BPL(A_i^s)$ a given predecessor node $A_i^p$ identified as being least important to schedule early, and label said given predecessor node $A_i^p$ as being bonded to its corresponding successor node $A_i^s$, such that said corresponding successor node $A_i^s$ is scheduled immediately after said given predecessor node $A_i^p$.

In an embodiment, said computer executable code is configurable to set a delay of 0 between said given predecessor node $A_i^p$ and its corresponding successor node $A_i^s$.

In another embodiment, said computer executable code is further configurable to: (c) set, before (b), a full delay DAi for all by-pass pairs $(A_i^p, A_i^s)$ in said by-pass list $BPL(A_i^s)$.

In another embodiment, said computer executable code is further configurable to: (d) remove from said by-pass list $BPL(A_i^s)$, after (c) and before (b), any by-pass pair $(A_i^p, A_i^s)$ that is a predecessor to any other by-pass pair $(A_i^p, A_i^s)$.

In another embodiment, said computer executable code is further configurable to: (e) re-compute, after (b), earliest times for each node in said DDG so that, if a node $A_i^p$ is bonded to node $A_i^s$, an earliest time for node $A_i^p$ is calculated as an earliest time for node $A_i^s$ less 1 execution cycle.

In another embodiment, said computer executable code is configurable to select at (b) a predecessor node $A_i^p$ with the shortest critical path.

These and other aspects of the invention will be apparent from the following more particular descriptions of exemplary embodiments of the invention.

BRIEF DESCRIPTION OF THE DRAWINGS

In the Figures which illustrate exemplary embodiments of the invention:

FIG. 3A is a table summarizing a critical path length and earliest time for each node of FIG. 2;

FIG. 3B is a table summarizing a ready to schedule list ("ready list") and a schedule for each node of FIG. 2;

FIG. 6 is a DDG illustrating a scheduling task with delays that may be dynamically set at by-pass edges;

FIG. 7A is a table summarizing a pre-computed critical path length and earliest time for each node of FIG. 6;

FIG. 7B is a table summarizing a critical path length and earliest time for each node of FIG. 6 after configuring the by-pass nodes and edges of the DDG in FIG. 6 in accordance with an embodiment of the present invention;

FIG. 7C is a table summarizing a ready list and a schedule for each node of FIG. 6 obtained using the table of FIG. 7B, in accordance with an embodiment of the present invention;

DETAILED DESCRIPTION OF EXEMPLARY EMBODIMENTS

Figure 1:
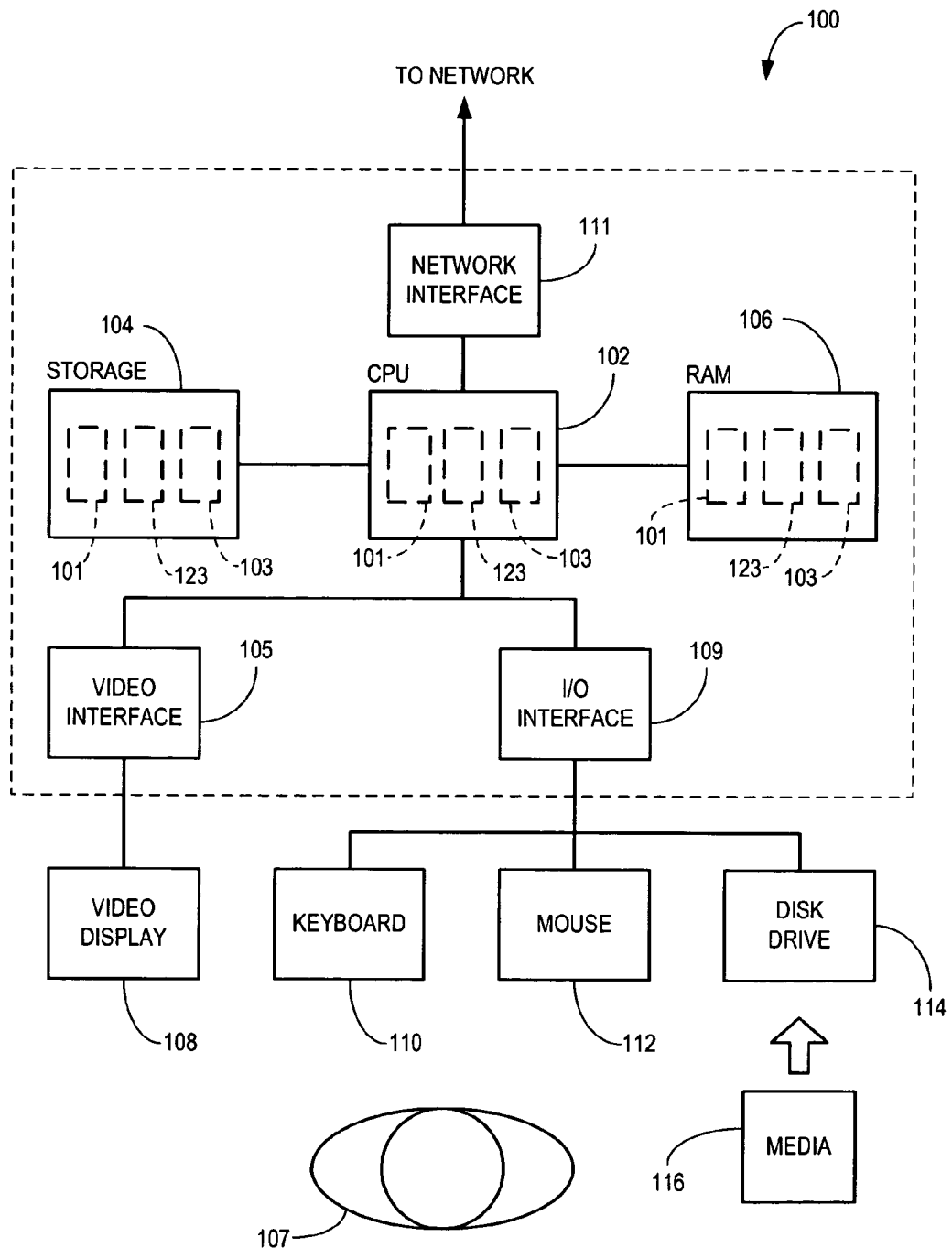
FIG. 1 is schematic block diagram of a data processing system which may provide an operating environment for practicing exemplary embodiments of the invention.

FIG. 1 shows an illustrative data processing system 100 that may provide an operating environment for exemplary embodiments of the invention. The data processing system 100 may include a central processing unit ("CPU") 102 connected to a storage unit 104 and to a random access memory ("RAM") 106. The CPU 102 may process an operating system 101, and a software program 103 compiled by a software program code compiler 123. The operating system 101, software program code compiler 123 and the software program 103 may be stored in the storage unit 104 and loaded into RAM 106, as required. A user 107 may interact with the data processing system 100 using a video display 108 connected by a video interface 105, and various input/output devices such as a keyboard 110, mouse 112, and disk drive 114 connected by an I/O interface 109. The disk drive 114 may be configured to accept computer readable media 116. Optionally, the data processing system 100 may be network enabled via a network interface 111.

It is assumed for the present purposes that the data processing system 100 supports dynamic by-pass execution as detailed further below. As will become apparent, the software program code compiler 123 of FIG. 1 may be configured to schedule instructions for executing code in a software program 103 using the teachings of the present invention. While it is assumed that the data processing system 100 supports dynamic by-pass execution, it will be appreciated that the data processing system 100 of FIG. 1 is merely illustrative and is not meant to be limiting in terms of the type of system that might provide a suitable operating environment for the invention.

Figure 2:
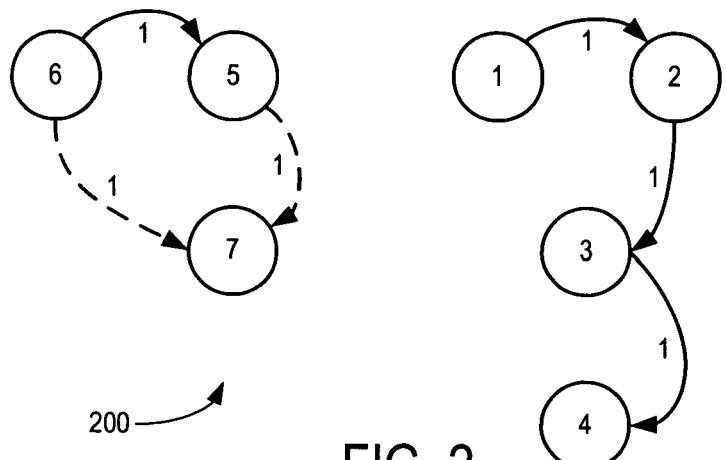
FIG. 2 is a DDG illustrating a scheduling task with only fixed delays.

FIG. 2 is a DDG illustrating a scheduling task in which seven instructions in a basic block (as represented by the seven numbered nodes) are to be scheduled. In this illustrative example, arbitrarily, there are two isolated regions or sub-graphs within the basic block represented by the DDG. A first isolated region includes nodes 1, 2, 3 and 4, and a second isolated region includes nodes 5, 6 and 7.

As shown, there are causal dependencies between some of the nodes, represented by directed edges connecting the nodes. For example, in the first isolated region or sub-graph comprising nodes 1, 2, 3 and 4, an edge connecting node 1 and node 2 indicates that there is a causal dependency between node 1 and node 2. More particularly, as indicated by the direction of the edge, node 2 is dependent upon node 1. For example, node 2 may require a result from node 1 in order to execute. Thus, scheduling of the instruction represented by node 2 must be performed after scheduling of the instruction represented by node 1.

As indicated by the label adjacent the edge between node 1 and node 2, the "weight" of the edge is 1. This weight represents the sum of a delay and latency between node 1 and node 2. (Assuming there is a latency of 1 cycle between each node, the delay between node 1 and node 2 in this case is 0.) Thus, after scheduling node 1, at least 1 execution cycle must pass before node 2 can be scheduled.

Based on the directional, labeled edge between node 2 and node 3, scheduling of node 3 must follow scheduling of node 2 with a wait at least 1 execution cycle. Also, based on the directional, labeled edge between node 3 and node 4, scheduling of node 4 must follow scheduling of node 3, with a wait of at least one execution cycle.

In the second isolated region or sub-graph comprising nodes 5, 6 and 7, an edge connecting node 5 and node 6 indicates that there is a causal dependency between node 5 and node 6. As also shown, an edge connects node 5 to node 7, and another edge connects nodes 6 to node 7, indicating other causal dependencies.

In summary, based on the directional, labeled edge between node 5 and node 6, node 5 must be scheduled after node 6, with a wait at least 1 execution cycle. Based on the directional, labeled edge between node 5 and node 7, node 7 must be scheduled after node 5 with a wait of at least 1 execution cycle. Finally, based on the directional, labeled edge between node 6 and node 7, node 7 must be scheduled after node 6, with a wait of at least 1 execution cycle. Node 7 may be scheduled only after node 5 and node 6 have both been scheduled.

In the DDG in FIG. 2, the dashed edges connecting node 5 to node 7, and node 6 to node 7, indicate that these are dynamic by-pass edges. This dashed edge notation to identify by-pass edges is used throughout the present description. The ability to by-pass a delay at an edge is a relatively recent advancement found in some modern computer architectures. Hardware pipeline optimizations found in these architectures allow for by-passing of delays given immediate sequential scheduling between causally dependent instructions. The ability to by-pass is thus predefined between a given pair of instructions within a particular hardware architecture.

Generally speaking, given a predecessor/successor by-pass "pair" of instructions represented by nodes $A_i^P$, $A_i^s$: delay $(A_i^P, A_i^s)$=0 if $A_i^s$ is immediately executed after $A_i^P$, and delay $(A_i^P, A_i^s)$=DAi, where DAi≠0, if $A_i^s$ is not immediately executed after $A_i^P$. In this case, DAi represents a full delay constant. In other words, the hardware architecture may permit a by-pass or a "short-cut" between certain pairs of instructions under certain circumstances. If the by-pass can be taken, then the resulting delay is 0. However, if for some reason the by-pass cannot be taken (e.g. another instruction intervenes during run-time execution), then the full delay DAi is incurred.

In the illustrative example in FIG. 2, assume that the full delay DAi, if a by-pass cannot be taken, is 5 execution cycles. For the purposes of scheduling in FIG. 2, say an optimistic assumption is made that by-pass is possible during run-time execution such that delays along the by-pass edges between node 5 and node 7, and between node 6 and node 7, are 0. As will be seen, if this optimistic assumption does not hold during run-time execution, then the full delay of 5 execution cycles will be incurred. (With latency, the total weight between node 5 and node 7, and between node 6 and node 7, would then be 6 execution cycles each.)

A known scheduling technique that may be used to handle the scheduling task for the DDG shown in FIG. 2, with a fixed delay of 0 along the by-pass edges based on the optimistic assumption made above, is now described. This technique is disclosed, for example, by Steven S. Muchnick in Advanced Compiler Design Implementation (San Francisco: Morgan Kaufmann Publishers, Inc., 1997), Ch. 17.

Referring to FIG. 3A, first, a critical path length is calculated for each node representing an instruction. Here, nodes 1-7 have critical path lengths of 3, 2, 1, 0, 1, 2 and 0, respectively. Based on the configuration of the DDG in FIG. 2, the "earliest time" or "Etime" is also calculated. As shown in FIG. 3A, since node 1 is not causally dependent upon any other node, the earliest time of node 1 is execution cycle 1. This may be expressed in short form as Etime (node 1)=1. As for node 2, since node 2 is causally dependent upon node 1, and the weight of the edge between node 1 and node 2 is 1, Etime (node 2)=2. Similarly, Etime (node 3)=3, and Etime (node 4)=4. As for node 5, since node 5 is causally dependent upon node 6, and the weight of the edge between node 6 and node 5 is 1, Etime (node 5)=2. Node 6 is not causally dependent upon any other node, and so Etime (node 6)=1. Finally, node 7 is causally dependent upon node 5 and node 6. As the weights along the edges from node 6 to node 5 to node 7 are 2, Etime (node 7)=3.

Based on the above calculations for critical path and Etime, each node in the DDG of FIG. 2 not dependent upon scheduling of another node is identified and placed in a ready to schedule list or "ready list", as shown in FIG. 3B. For example, in FIG. 2, both node 1 and node 6 do not depend on the scheduling of any other node and the earliest time for each node is 1. Thus, at cycle 1, the ready list includes node 1 and node 6. This may be expressed in short form as Rlist={1, 6}. At the same time, the critical path length for each node in this ready list is obtained. From FIG. 3A, it is known that the length of the critical path for node 1 is 3, while the length of the critical path for node 6 is 2.

Given that the critical path for node 1 is longer than for node 6, in order to attempt to minimize the overall delay, it is more important to schedule node 1 first. Thus, as shown in FIG. 3B, at execution cycle 1, node 1 is scheduled. The ready list is then updated with any other nodes that are ready to be scheduled. As shown, scheduling of node 1 at cycle 1 now allows node 2 to be placed in the ready list such that Rlist={2, 6}. As between node 2 and node 6, from FIG. 3A, it is seen that they have the same critical path length of 2. In a tie situation such as this, a suitable tie breaking heuristic function may be used to decide between scheduling node 2 and node 6. By way of example, a suitable tie breaking heuristic function that may be used is described in Smotherman et al., "Efficient DAG Construction and Heuristic Calculation for Instruction Scheduling," Proc. of the 24th Annual Intl. Symp. on Microarchitecture, Albuquerque, N.M., November 1991, pp. 93-102.

Assuming that node 2 is scheduled next based on this tie breaking heuristic function, node 2 is removed from the ready list and scheduled after node 1 at execution cycle 2.

Repeating this process, after node 2 is scheduled, node 3 can be placed into the ready list such that Rlist={3, 6}. As between node 3 and node 6, node 6 has the longer critical path. Thus, node 6 is scheduled next at execution cycle 3.

After node 6 has been scheduled, node 5 may be placed into the ready list such that Rlist={3, 5}. As between node 3 and node 5, both nodes have a critical path length of 1 (as read from FIG. 3A). In another tie such as this, a suitable tie breaking heuristic function such as that described by Smotherman et al. may be used to schedule node 3 or node 5 next.

Assuming that node 5 is scheduled next at execution cycle 4, node 7 may be placed into the ready list such that Rlist={3, 7}. As between node 3 and node 7, from FIG. 3A, it is seen that node 3 has the longer critical path. Thus, node 3 is scheduled next at execution cycle 5.

After node 3 has been scheduled, node 4 may be placed in the ready list such that Rlist={4, 7}. From FIG. 3A, it is seen that node 4 and node 7 both have a critical path length of 0. Again, based on a suitable tie breaking heuristic function such as that described by Smotherman et al., one of node 4 and node 7 is scheduled next.

Assuming that node 7 is scheduled next, even though an optimistic assumption has been made that the delay between node 5 and node 7 is 0, if a by-pass is not possible, the full delay of $DA_i=5$ cycles is incurred. Here, node 3 intervenes between node 5 and node 7 so by-pass is not possible. With a latency of 1 execution cycle, the total "weight" between node 5 and node 7 is 6 execution cycles. Thus, node 7 may be scheduled after waiting a total of 6 cycles after node 5 is scheduled. In this illustrative example, as node 5 is scheduled at execution cycle 4, node 7 is scheduled at execution cycle 10.

After node 7 is scheduled, the last remaining node in the ready list, namely node 4, may be scheduled. As there is no further delay, node 4 is scheduled at execution cycle 11. With this scheduling technique, it is seen that the total execution time is 11 cycles.

Figures 4, 5A, 5B:
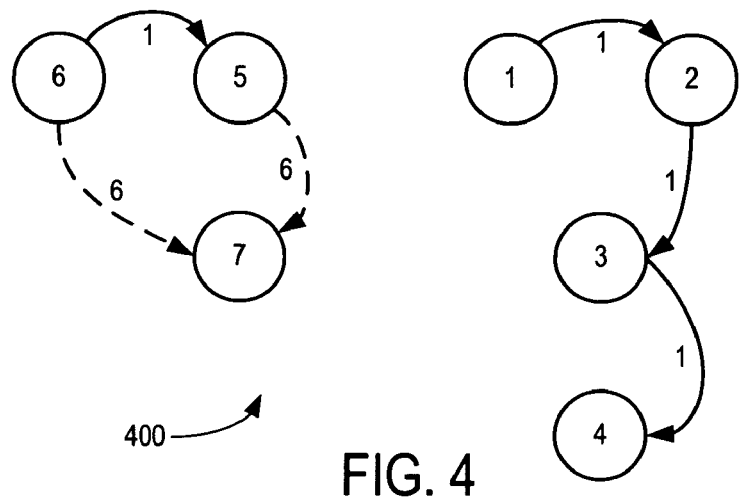
FIG. 4 is a DDG illustrating another scheduling task with only fixed delays.
FIG. 5A is a table summarizing a critical path length and earliest time for each node of FIG. 4.
FIG. 5B is a table summarizing a ready list and a schedule for each node of FIG. 4.

In a related example, FIG. 4 is another DDG illustrating a scheduling task generally corresponding to the scheduling task in FIG. 2, but in which a pessimistic assumption has been made in setting a fixed delay $DA_i=5$ execution cycles between node 5 and node 7, and between node 6 and node 7. With a latency of 1 cycle in each case, the weight on the edge between node 5 and node 7, and between node 6 and node 7, is now 6 cycles. As will become apparent, this pessimistic assumption affects the overall order of scheduling of instructions, and also affect the total execution time for the instructions. Once again, the technique disclosed in Muchnick may be used.

As shown in FIG. 5A, a critical path length may again be calculated for each of the nodes 1-7. Based on the fixed delay between node 5 and node 7, and between node 6 and node 7, the critical path lengths for nodes 1-7 are now 3, 2, 1, 0, 6, 7, and 0, respectively. Based on the configuration of the DDG in FIG. 4, the earliest times for each of the nodes 1-7 are 1, 2, 3, 4, 2, 1, and 8, respectively.

As shown in FIG. 5B, once again the ready list is initially {1, 6}. However, as the delays between node 5 and node 7, and between node 6 and node 7, have been increased to 5 cycles based on a pessimistic assumption (with latencies of 1 cycle for a total weight of 6 cycles each), node 6 now has the longer critical path. Thus, node 6 is removed from the ready list and scheduled first at execution cycle 1.

After node 6 has been scheduled, node 5 may be placed into the ready list such that Rlist={1, 5}. As between node 1 and node 5, as shown in FIG. 5A, node 5 has a longer critical path than node 1. Thus, node 5 is scheduled next at execution cycle 2.

After node 5 has been scheduled, node 7 may be placed into the ready list such that Rlist={1, 7}. As between node 1 and node 7, node 1 now has a longer critical path. Thus, node 1 is scheduled next at execution cycle 3.

After node 1 has been scheduled, node 2 may be placed into the ready list such that Rlist={2, 7}. As between node 2 and node 7, node 2 has the longer critical path. Thus node 2 is scheduled next at execution cycle 4.

After node 2 has been scheduled, node 3 may be placed into the ready list such that Rlist={3, 7}. As between node 3 and node 7, with critical path lengths of 1 and 0 respectively, node 3 has the longer critical path. Thus, node 3 is scheduled next at cycle 5.

After node 3 has been scheduled, node 4 may be placed into the ready list such that, as shown at line 320, Rlist={4, 7}. As between node 4 and node 7, the critical path length for both nodes is the same, namely 0. In the case of a tie such as this, once again a suitable tie breaking heuristic function may be used to schedule the next node. In this illustrative example, assume that node 7 is scheduled next. Since the pessimistic assumption made earlier was $DA_i=5$, node 7 must wait at least 6 cycles after scheduling node 5. Since node 5 was scheduled at execution cycle 2, node 7 is scheduled at execution cycle 8.

After node 7 has been scheduled, node 4 is the only node remaining in the ready list. As there is no further delay, node 4 is scheduled last at execution cycle 9. With this scheduling technique, it is seen that the total execution time is 9 cycles.

As shown in the above illustrative examples in FIG. 2 and FIG. 4, changing assumed delays between by-pass nodes in a DDG may significantly affect the scheduling order of the nodes. As also shown, changing assumed delays may also affect the total execution time of instructions represented by the nodes. However, as the assumed delays at the by-pass edges in FIG. 2 and FIG. 4 are fixed at the time the DDG is created (whether pessimistically set or optimistically set), there is no further opportunity to affect the resulting scheduling order of the nodes.

As will now be explained, in a computer architecture permitting dynamic by-pass instruction execution, configuring a DDG for dynamic by-pass instruction scheduling may lead to a more efficient scheduling order with a reduction in total execution time.

As an example, FIG. 6 shows a DDG with a scheduling task which may be performed using a method and system in accordance with the teachings of the invention. As shown, the causal dependencies between the nodes in the DDG of FIG. 6 generally correspond to the causal dependencies in FIG. 2 and in FIG. 4. However, as will become apparent, the assumed delays at the by-pass edges between node 5 and node 7, and between node 6 and node 7, may now be changed dynamically rather than being fixed.

In the DDG in FIG. 6, a class of by-pass instructions may be generally expressed as $A=(A^p, A^s)$, where $A^p$ represents a class of predecessor nodes and $A^s$ represents a class of successor nodes.

In the illustrative example in FIG. 6, nodes 5 and 6 belong to the class $A^p$. Node 7 belongs to the class $A^s$. As previously noted, by-pass edges between node 5 and node 7, and between node 6 and node 7, are identified as dashed lines. Nodes 1, 2, 3 and 4 neither belong to class $A^p$ nor to $A^s$, since there are no by-passable edges connecting any of nodes 1, 2, 3 or 4.

Under the Muchnick technique presented earlier with reference to the DDGs in FIG. 2 and FIG. 4, if the delay $(A_i^p, A_i^s)$ is optimistically set to 0 when creating a DDG, there is no guarantee that $A_i^s$ will be scheduled immediately after $A_i^p$. Setting a full delay where $(A_i^p, A_i^s)=DAi$ is also suboptimal since, in this case, the scheduler may try to move instructions $A_i^p$ and $A_i^s$ apart based on the delay DAi. If there are insufficient instructions to fill the DAi bubble or gap between $A_i^p$ and $A_i^s$, a pipeline stall may occur. Therefore, it is desirable to have a technique for setting such delays dynamically.

Now referring to FIG. 7A, in an embodiment of the invention, a suitable heuristic function is first used to rank the paths in the DDG after presetting all delays for by-pass pairs from class A to 0. In the present illustrative example, the critical paths for each node in the DDG are used. Initially, as the delays from class A are set to 0, the "pre-computed" critical path lengths and earliest times are the same as that shown in FIG. 3A, above. Namely, the critical path lengths for nodes 1-7 are 3, 2, 1, 0, 1, 2 and 0, respectively, and the earliest times are 1, 2, 3, 4, 2, 1 and 3, respectively.

FIG. 7B is a table summarizing a critical path length and earliest time for each node of FIG. 6 after configuring the nodes and edges of the DDG in FIG. 6 in accordance with an embodiment of the present invention. More generally, a pair of nodes with a by-pass edge therebetween, such as between node 5 and node 7, and between node 6 and node 7, may undergo a configuration change referred to in the present description as "bonding". After undergoing such a configuration change, the critical path lengths and earliest times also change. More specifically, the critical path lengths for nodes 1-7 become 3, 2, 1, 0, 1, 6 and 0, respectively, and the earliest times become 1, 2, 3, 4, 6, 1 and 7, respectively. This will be explained in further detail below.

As shown in FIG. 7C, the scheduling order resulting from the change in configuration described above is different from the scheduling order in FIG. 5B. As will now be explained, the different scheduling order shown in FIG. 7C is obtained by configuring the DDG at the by-pass nodes and edges in accordance with the teachings of the present invention.

Figure 8:
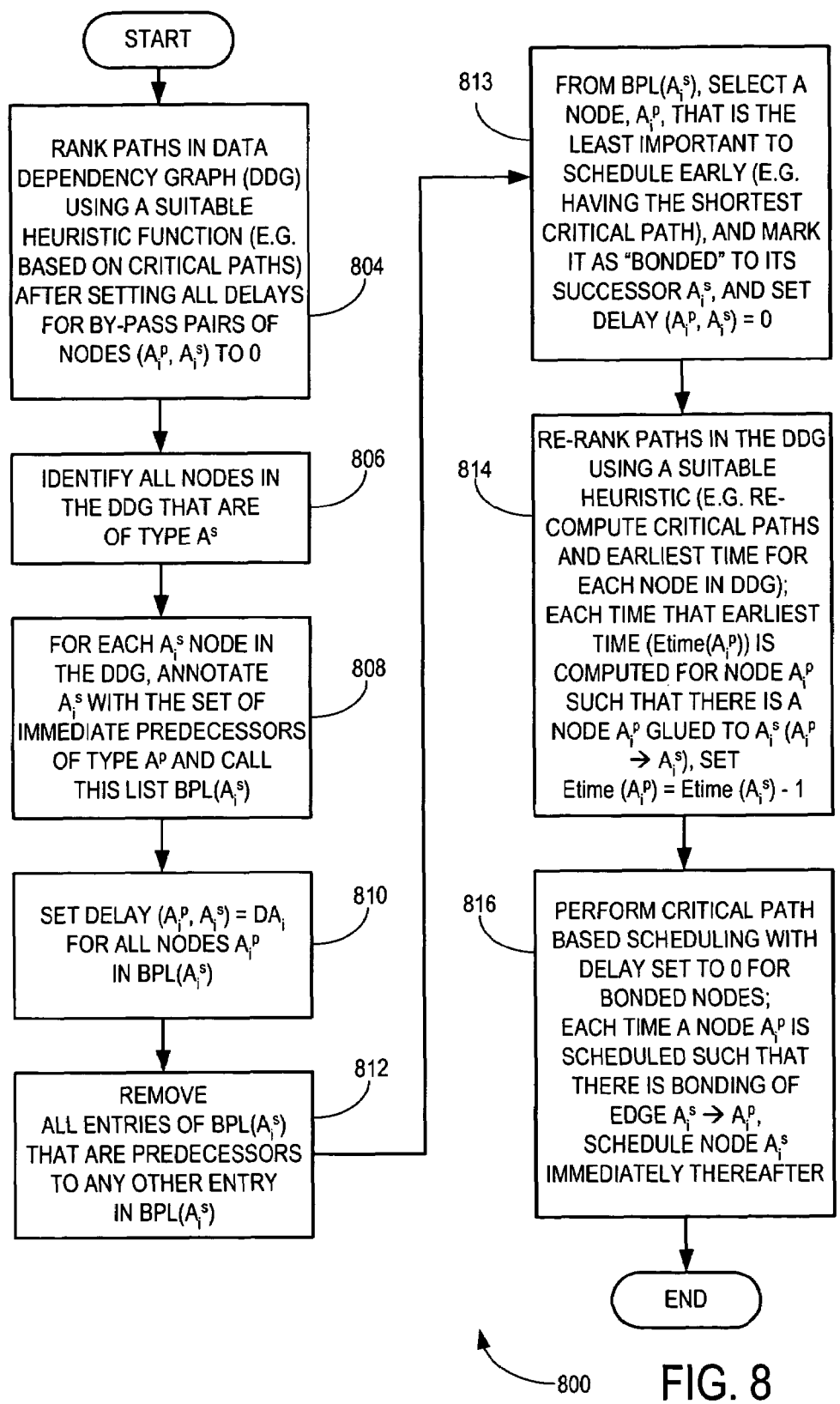
FIG. 8 is a schematic flow chart of a method in accordance with an embodiment of the invention.

Referring to FIG. 8, shown is an illustrative method 800 in accordance with an embodiment of the present invention. Method 800 begins and, at block 804, uses a suitable heuristic function to obtain a relative ranking of paths in the DDG while presetting all delays for pairs from class $A=(A^p, A^s)$ to 0. In the present illustrative example, method 800 pre-computes the ranking using critical paths for each node in the DDG of FIG. 6. As previously defined, a critical path for an instruction "i" is the sum of the weights along the path from "i" to the furthest leaf node in the graph, the weights being the sum of delays and latencies on each edge. In the present illustrative example in FIG. 6, assuming the same maximum delay of 0 cycles between node 5 and node 7, and between node 6 and node 7 (resulting in edge weights of 1, respectively) the same critical path lengths as shown in FIG. 3A initially results.

Next, at block 806, method 800 identifies all nodes in the DDG that are of type $A^s$ (i.e. successor nodes of a predecessor/successor pair in set A). In the present illustrative example in FIG. 6, $A^s=\{7\}$.

At block 808, for each $A_i^s$ node in the set A, method 800 annotates the $A_i^s$ node with the set of immediate predecessors of type $A^p$. Call this list of by-pass candidates the by-pass list or $BPL(A_i^s)$. In the present illustrative example, $BPL(7)=\{5, 6\}$.

At block 810, for each $BPL(A_i^s)$, method 800 sets delay $(A_i^p, A_i^s)=DAi$ for all nodes $A_i^p$ in $BPL(A_i^s)$. Thus, in the present illustrative example, DAi for both node 5 and node 6 is set to 5 execution cycles.

At block 812, method 800 removes all entries of $BPL(A_i^s)$ that are predecessors (not necessarily immediate predecessors) to any other entry in $BPL(A_i^s)$. In the present illustrative example, as node 6 is a predecessor of node 5, node 6 is removed from $BPL(A_i^s)$.

At block 813, method 800 selects a node, $A_i^p$, with the shortest critical path (and therefore the least important to schedule early), marks it as being "bonded" to its respective successor $A_i^s$, and sets delay $(A_i^p, A_i^s)=0$. In the present illustrative example, as shown in FIG. 7B, node 5 has the shortest critical path. It is also the only node left in $BPL(A_i^s)$ after removal of node 6. Thus, delay (5, 7) is set to 0. (However, with a latency of 1 execution cycle, the weight between node 5 and node 7 is 1, as shown in FIG. 6.)

At block 814, method 800 re-computes the critical paths after marking the shortest critical path as described above. After "bonding" node 5 to node 7, and setting the delay between node 5 and node 7 to zero (with a resulting weight of 1), the resulting critical path lengths for nodes 1-7 are 3, 2, 1, 0, 1, 6 and 0, respectively. At block 814, method 800 also re-computes the earliest time for each node. In accordance with the teachings of the present invention, the earliest times for nodes in the DDG bonded to another are calculated in the following way: Each time the earliest time for a node $A_i^s$ is calculated, where there is a node $A_i^p$ "bonded" to node $A_i^s$ (i.e. $A_i^p \rightarrow A_i^s$), Etime $(A_i^s)$=Etime $(A_i^p)-1$. In the present illustrative example, node 5 is bonded to node 7. Since Etime (7)=7, Etime (5)=7−1=6. Thus, the corresponding earliest times for nodes 1-7 are now 1, 2, 3, 4, 6, 1 and 7, respectively.

Finally, at block 816, method 800 performs critical path based instruction scheduling by handling the "bonded" nodes 5 and 7 in the following way: Each time a node $A_i^p$ is scheduled such that there is a "bonded" edge $A_i^p \rightarrow A_i^s$, schedule node $A_i^s$ immediately thereafter in the next execution cycle. In the present illustrative example, this results in node 7 being scheduled immediately after node 5. The result is that a node $A_i^p$ from BPL ($A_i^s$) which is "bonded" to $A_i^s$ is scheduled as late as possible, just before $A_i^s$ is executed. This is optimal since, as before described, it is least important to schedule a bonded $A_i^p$ early due to its shortest critical path when the delay between by-pass nodes is assumed to be 0.

Based on the critical path lengths and earliest times recalculated at block 814, and the configuration of the DDG in FIG. 6, the scheduling order shown in FIG. 7B results. More specifically, this scheduling order is obtained as follows:

First, any nodes which may be immediately scheduled are identified and placed in a ready list. In this illustrative example, node 1 and node 6 are ready to be scheduled at the start, so Rlist={1, 6}. As between node 6 and node 1, node 6 has the longer critical path, and is therefore scheduled first in execution cycle 1.

After node 6 is scheduled, node 5 is ready to be scheduled and is placed in the ready list, such that Rlist={1, 5}. As between node 1 and node 5, node 1 has the longer critical path, and is therefore scheduled next in execution cycle 2.

After node 1 is scheduled, node 2 is ready to be scheduled and is placed in the ready list, such that Rlist={2, 5}. As between node 2 and node 5, node 2 has the longer critical path, and is scheduled next in execution cycle 3.

After node 2 is scheduled, node 3 is ready to be scheduled and is placed in the ready list, such that Rlist={3, 5}. As between node 3 and node 5, the nodes have the same critical path length. In case of a tie such as this, a suitable tie breaking heuristic function may be used. For the purposes of the present example, assume that node 3 is scheduled next in execution cycle 4.

After node 3 is scheduled, node 4 is ready to be scheduled and is placed in the ready list, such that Rlist={4, 5}. As between node 4 and node 5, node 5 has the longer critical path, and is scheduled next in execution cycle 5.

Upon scheduling of node 5, node 7 is scheduled immediately thereafter, as it is "bonded" to node 5. This "bonding" of node 5 to node 7 results in a by-pass with a 0 delay on the edge between node 5 and node 7. The scheduling of node 5 and node 7 in this manner will significantly increase the likelihood that a by-pass can be successfully taken between node 5 and node 7 during run-time execution.

With the scheduling technique taught by the present invention, it is seen that the total execution time is 7 cycles. This compares favorably to a total execution time of 11 cycles in the example shown in FIG. 3B, and 9 cycles in the example shown in FIG. 5B. Advantageously, by configuring the DDG to selectively by-pass a delay on an edge by "bonding" a by-pass pair of predecessor/successor nodes, scheduling efficiency may be improved.

While various embodiments of the invention have been described above, it will be appreciated by those skilled in the art that variations and modifications may be made. In particular, while the disclosed embodiment describes utilizing critical paths for nodes in ranking paths in the DDG, it will be appreciated that some other suitable heuristic function may also be used.

Also, while method 800 illustrates a particular embodiment of the present invention, it will be appreciated that method 800 is merely illustrative and is not meant to be limited to the particular order of steps shown. The steps in method 800 may thus be combined, modified or reordered such that the end result is still the same.

Thus, the scope of the invention is defined by the following claims.

What is claimed is:

1. A method of performing dynamic by-pass instruction scheduling utilizing a data dependency graph (DDG), said DDG including at least one by-pass pair of nodes ($A_i^p$, $A_i^s$) comprising a predecessor node $A_i^p$ and a successor node $A_i^s$ connected by a by-pass edge, said method comprising:
   computing a ranking of nodes in said DDG after setting all delays for by-pass pairs of nodes ($A_i^p$, $A_i^s$) to 0;
   identifying all successor nodes $A_i^s$ in said DDG;
   annotating each successor node $A_i^s$ with a set of immediate predecessor nodes $A_i^p$ to form a by-pass list BPL($A_i^s$) of by-pass pairs ($A_i^p$, $A_i^s$);
   setting a delay DAi for all by-pass pairs ($A_i^p$, $A_i^s$) in said by-pass list BPL($A_i^s$);
   removing from said by-pass list BPL($A_i^s$) any by-pass pair ($A_i^p$, $A_i^s$) that is a predecessor to any other by-pass pair ($A_i^p$, $A_i^s$);
   selecting from said by-pass list BPL($A_i^s$) a given predecessor node $A_i^p$ being identified as the least important to schedule early, and marking said given predecessor node $A_i^p$ as being bonded to its corresponding successor node $A_i^s$ with a delay of 0 execution cycles;
   re-computing a ranking for each node in said DDG so that an earliest time for said given predecessor node $A_i^p$ is calculated as an earliest time for said successor node $A_i^s$ less 1 execution cycle; and
   scheduling nodes in said DDG so that, each time said given predecessor node $A_i^p$ is scheduled, said corresponding successor node $A_i^s$ is scheduled immediately thereafter;
   wherein said ranking of nodes in said DDG is computed and re-computed based on a critical path of said nodes, and said selecting a predecessor node $A_i^p$ is based on identifying a given predecessor node $A_i^p$ as having the shortest critical path.

* * * * *